United States Patent [19]
Fitzgerald

[11] Patent Number: 5,427,494
[45] Date of Patent: Jun. 27, 1995

[54] CONTAINER CARRIER

[76] Inventor: Stanley R. Fitzgerald, 4872 Marion-Mt. Gilead Rd., Caledonia, Ohio 43314

[21] Appl. No.: 24,123

[22] Filed: Mar. 1, 1993

[51] Int. Cl.6 .................................................. B60P 3/00
[52] U.S. Cl. ..................................... 414/459; 212/343; 414/618; 414/622
[58] Field of Search ............... 212/218, 220, 140, 141, 212/142; 414/618, 619, 621, 622, 620, 458, 459, 490

[56] References Cited

U.S. PATENT DOCUMENTS

| | | | |
|---|---|---|---|
| 485,742 | 11/1892 | Herzberg et al. | 212/140 |
| 1,033,277 | 7/1912 | Seashole | 212/140 |
| 1,096,874 | 5/1914 | Von Der Malsburg | 212/140 |
| 1,293,699 | 2/1919 | Cannon | 414/458 |
| 1,520,047 | 12/1924 | Alden et al. | 212/142 |
| 1,717,377 | 6/1929 | Forry | 414/458 |
| 1,728,519 | 9/1929 | Tuerck | 414/458 |
| 2,028,976 | 1/1936 | Goff | 280/53 |
| 2,598,515 | 5/1952 | Dickson | 414/622 |
| 3,009,592 | 11/1961 | Troller | 414/621 |
| 3,351,370 | 11/1967 | Olson | 414/618 |
| 3,760,964 | 9/1973 | Trapp | 214/390 |
| 4,029,230 | 6/1977 | Bolduc et al. | 414/618 |
| 4,130,212 | 12/1978 | Gatilao | 414/622 |
| 4,239,443 | 12/1980 | Rysewyk | 414/618 |
| 4,508,485 | 4/1985 | Mlinaric et al. | 414/458 |
| 4,741,659 | 5/1988 | Berg | 414/450 |
| 5,122,027 | 6/1992 | Tabayashi | 414/622 |

Primary Examiner—Michael S. Huppert
Assistant Examiner—Thomas J. Brahan
Attorney, Agent, or Firm—John L. Gray

[57] ABSTRACT

A four-wheel device used to lift drums with compressed air stored in an on-board storage tank without special straps, tools, or clamps that allows the operator to lift the drum with no physical stress and to roll the unit to another location with minimum effort.

5 Claims, 7 Drawing Sheets

CONTAINER CARRIER

BACKGROUND OF THE INVENTION

Most devices for lifting and moving a container such as a 55 gallon drum require a fork truck or manual clamp around the drum. Other devices require the operator to use excessive manual force to tip the drum in order to move it. Tipping drums can be very dangerous because a drum can tip forward and injure another person or tip backward resulting in the carrier and the drum falling on top of the operator.

SUMMARY OF THE INVENTION

The instant invention does not require excessive physical force nor does it require wrap around straps in order to engage and lift and subsequently transport a drum or other container. The device engages the upper ring or lip with which a 55 gallon drum is provided at two points other than a diameter of the ring thus permitting the lower portion of the drum to swing slightly so that it rests against a support resulting in three point contact of the drum to the carrier. The drum is lifted by means of air pressure.

It is therefore an object of this invention to provide a safe device to lift and transport a container such as a 55 gallon drum using no manual lifting effort on the part of the operator.

It is a further object of this invention to provide such a device which may be used to stack 55 gallon drums on a pallet.

These, together with other objects and advantages of the invention will become more readily apparent to those skilled in the art when the following general statements and descriptions are read in the light of the appended drawings.

DETAILED DESCRIPTION OF THE INVENTION

Figure 1:
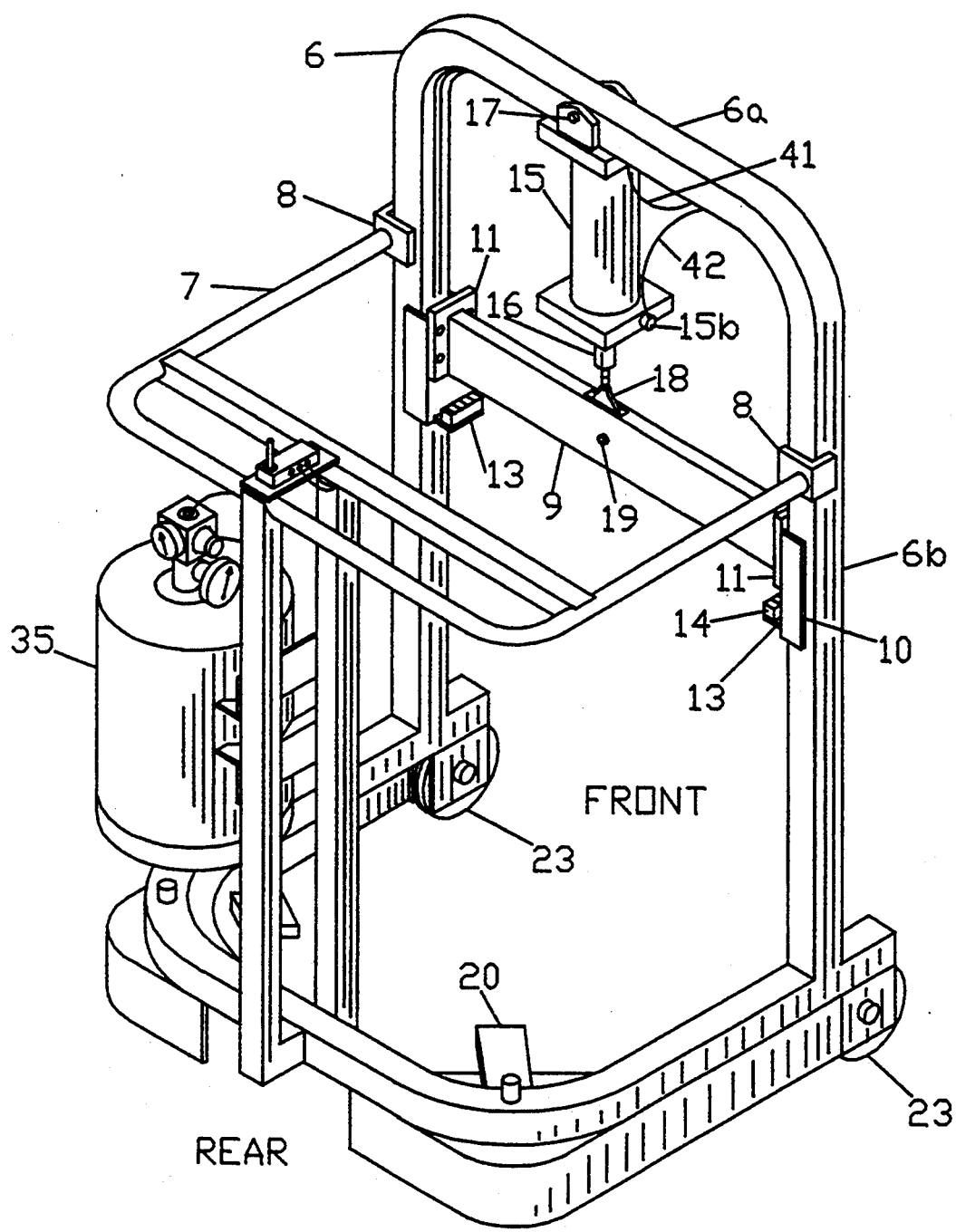
FIG. 1 is a perspective view of the container carrier.
Figure 2:
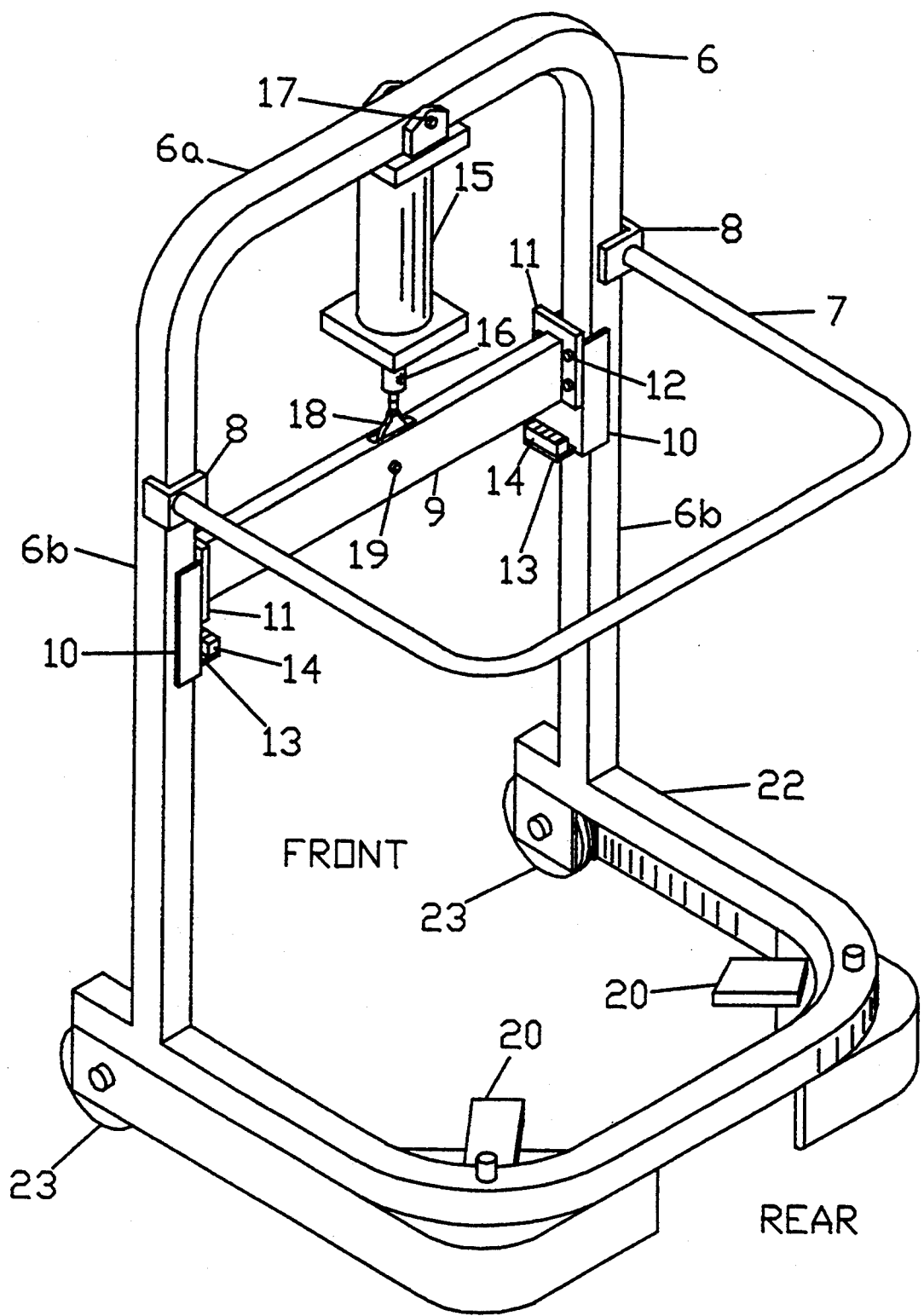
FIG. 2 is a perspective view of the same carrier from a different perspective with the air tank and its accompanying supports and controls removed.
Figure 3:
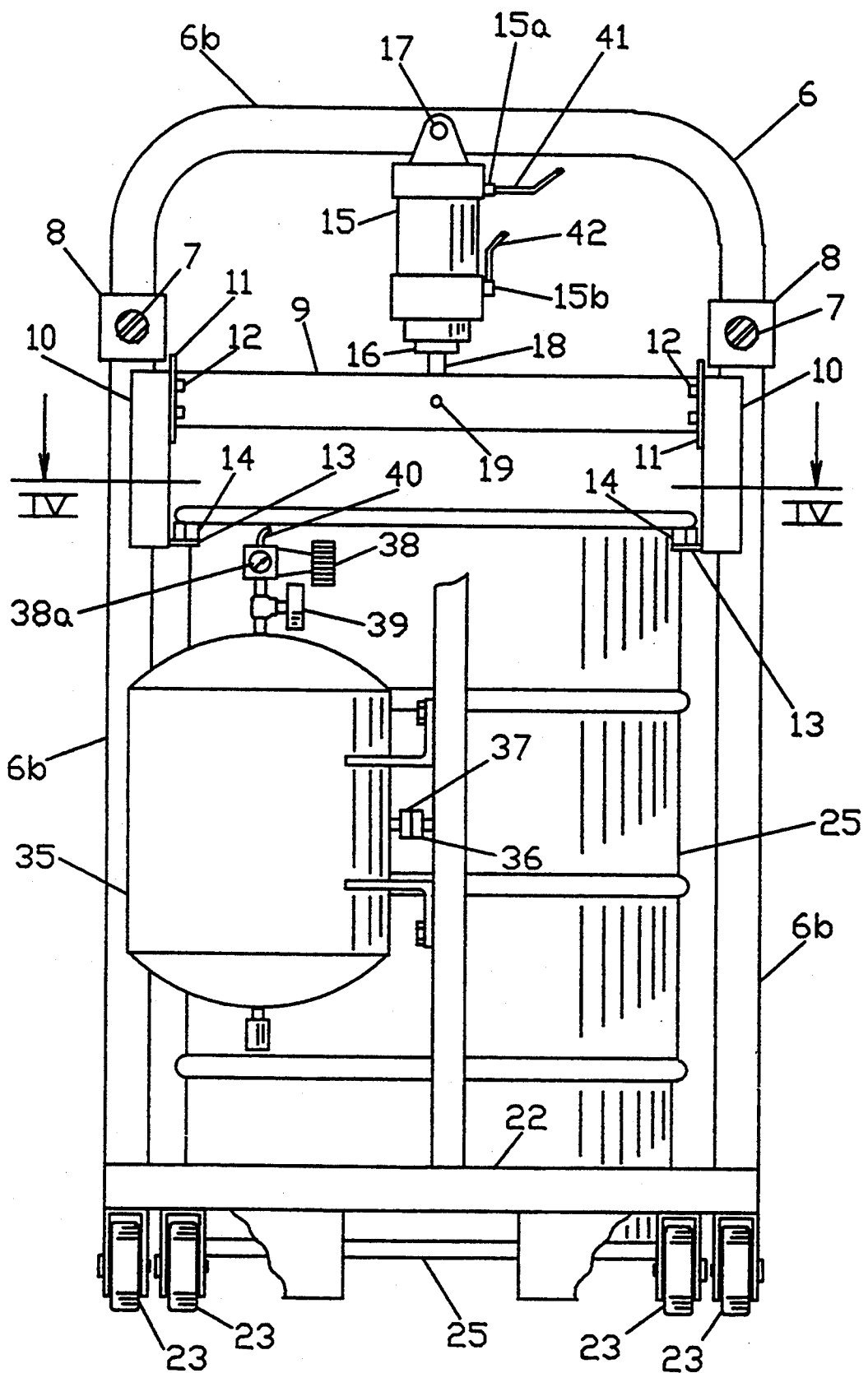
FIG. 3 is a rear elevation view of the container carrier with portions broken away showing a drum in a lifted position on the carrier.

Referring more particularly to the drawings and especially to FIGS. 2 and 3, the upright 6 is a U-shaped member with the open end turned down, and attached to the frame 22. The upright 6 is high enough to fit over the height of the drum 25, shown in a raised position and clear of the floor with the drum sitting upright. A handle 7 is attached to the upright 6 by member 8 in such a manner as to allow an open space for the slide mechanism 10 to travel between member 8 and upright 6. The handle 7 enables the operator to push or pull the cart for maneuvering around drums and other obstacles.

At the center of the arch an air cylinder 15 is mounted vertically with the piston rod 16 protruding from the bottom of the cylinder. The cylinder 15 is hanging below the arch 6 and supported by pin 17 through a horizontal hole through the arch 6a. The cylinder 15 and piston rod 16 are standard items readily available in the market place.

Figure 4:
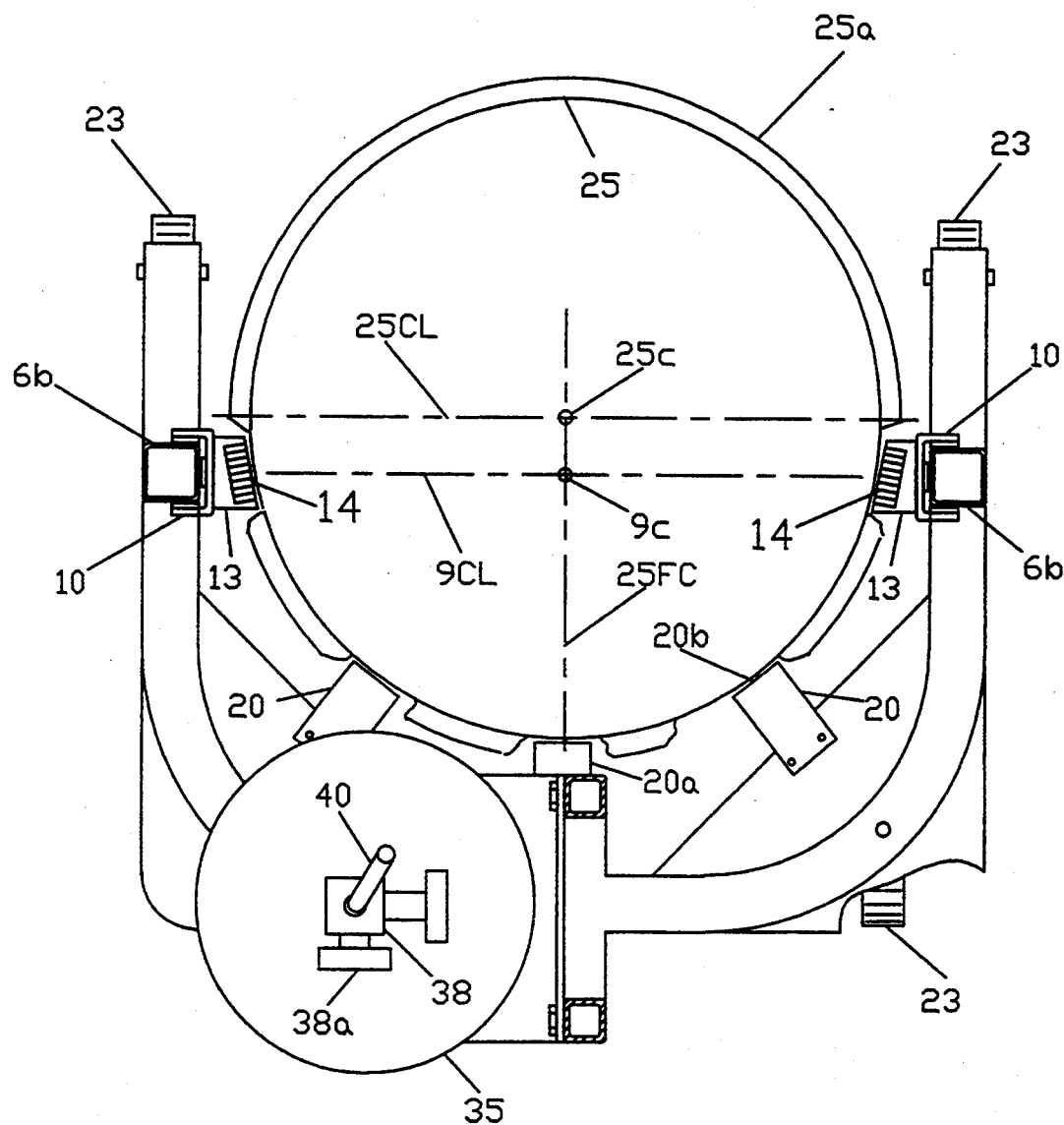
FIG. 4 is a sectional plan view of the carrier showing a drum in lifted position on the carrier along the section lines IV—IV in FIG. 3.
Figure 5:
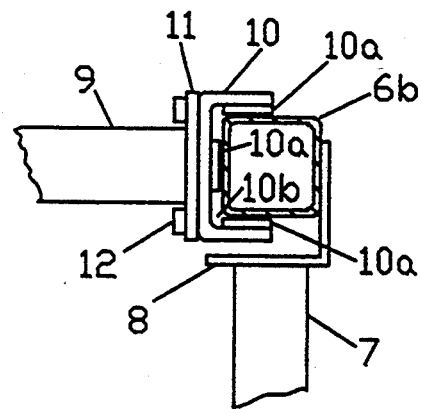
FIGS. 5 and 6 are details of portions of the container ring support and the air cylinder, respectively.
Figure 6:
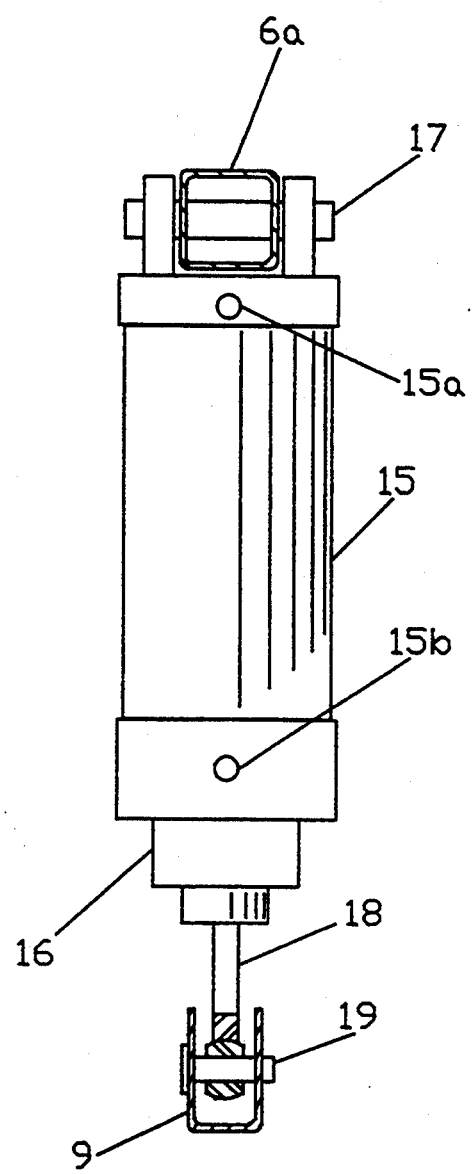

A ball joint assembly or rod end 18 is connected to the lower end of the cylinder rod 16, as shown in FIG. 6. The rod end 18 is a standard item readily available in the market place. Referring to FIGS. 2 and 3, a crossarm 9 is connected to the rod end 18 by means of a pin 19. This arrangement allows the crossarm 9 to travel up and down in a vertical direction with the piston rod 16. Both ends of the crossarm 9 are connected to end plates 11—11. Screws 12—12 are used to connect end plates 11—11 to the two slide mechanisms 10—10. The slide mechanisms 10—10 are U-shaped members that wrap around the uprights 6b—6b as shown in FIGS. 4 and 5, in such a manner that the uprights 6b—6b guide the motion of the crossarm 9 and the slide mechanisms 10—10. The slide mechanisms 10—10 include wear runners 10a—10a in the gaps 10b—10b between the slide mechanisms 10—10 and the uprights 6b—6b, the wear runners 10a—10a act as a lubricant to provide for smooth movement of the crossarm 9 in a vertical direction.

Referring to FIGS. 2 and 3, attached to the two slide mechanisms are the lip supports 13—13 and the lips 14—14, there being one lip support and one lip for each slide mechanism.

Referring to FIGS. 3 and 4, the lips 14—14 engage the drum 25 below the top ring 25a at two points on line 9cl, other than a diameter of the drum 25cl, thus permitting the drum to tip a vertical small distance until blocked by lower supports 20—20 which stabilize the drum 25. The drum ring 25a is not grasped from both above and below as in most other inventions. In this invention the drum ring 25a is supported only from below and is not mechanically locked by the lifting device. The weight and gravity of the drum provides the holding force required to secure the drum 25 when lifted by lips 14—14. When the crossarm 9 is raised by air pressure in the cylinder 15, the lip 14 engages the top ring 25a of a drum and as the crossarm 9 is raised and continues to rise, it lifts the drum 25 until the drum clears the floor or pallet on which it was supported prior to being lifted. Once the drum 25 is lifted, the air pressure in the cylinder supports the drum and crossarm 9 and can support them indefinitely without using any additional energy or generating any heat.

With the drum 25 in the engaged and lifted position, the operator holding the handle 7 can push and pull the cart and drum easily, and the drum and cart can be moved anywhere desired on a level or near level floor.

Referring to FIG. 4, as the operator pushes the cart toward the drum 25, the lips 14—14 on the crossarm centerline 9CL passing through the center of the crossarm at 9C, engage the drum 25 before reaching the transverse centerline 25CL, passing through the drum center 25C. The drum itself stops the cart from moving beyond this position. Cart forward motion is stopped when the lips 14—14 touch the sides of the drum 25. When the drum is lifted by the two lips 14—14, the center of gravity of the drum weight at 25C causes a rotational force which moves the bottom of the drum toward the operator. This movement is stopped by the lower supports 20. There is a small gap 20b between the lower support 20 and the drum 25 before lifting the drum. When the drum 25 is lifted, the drum rotates and touches the support 20. The lower support 20 can be a single support 20a on the frontal centerline 25FC of the drum or two supports as shown, one on either side of the frontal centerline 25FC. Therefore, the drum is lifted by the lips, the drum rotates slightly until it reaches the lower support(s) 20—20, the drum is stabilized by the three or four points of support, thereby completing the grasping of the drum. The force applied at the lower support 20 is directly proportional to the weight of the drum and to the distance from the transverse centerline of the drum 25CL to the centerline of the crossarm 9CL. Therefore, increasing the weight of the drum 25 increases the clamping force also. In the manner described above, the weight of the drum is used to grasp the drum, the heavier the drum, the firmer the grasp. The drum lift cart upon lifting the drum likewise becomes more stable than the empty cart. This is in direct contrast to many drum lift devices available in the market place which become very unstable when the drum is lifted by tilting a wheeled cart.

The two lifting lips 14—14 are widely spaced to increase stability but less than the maximum width of the drum 25 to allow slight changes in the size of the drum without requiring any adjustments. The location of the lifting lips 14—14 on line 9cl behind the center line of the drum 25cl causes the drum bottom to move against the lower support 20 creating a very stable means of grasping the drum 25.

Figure 7:
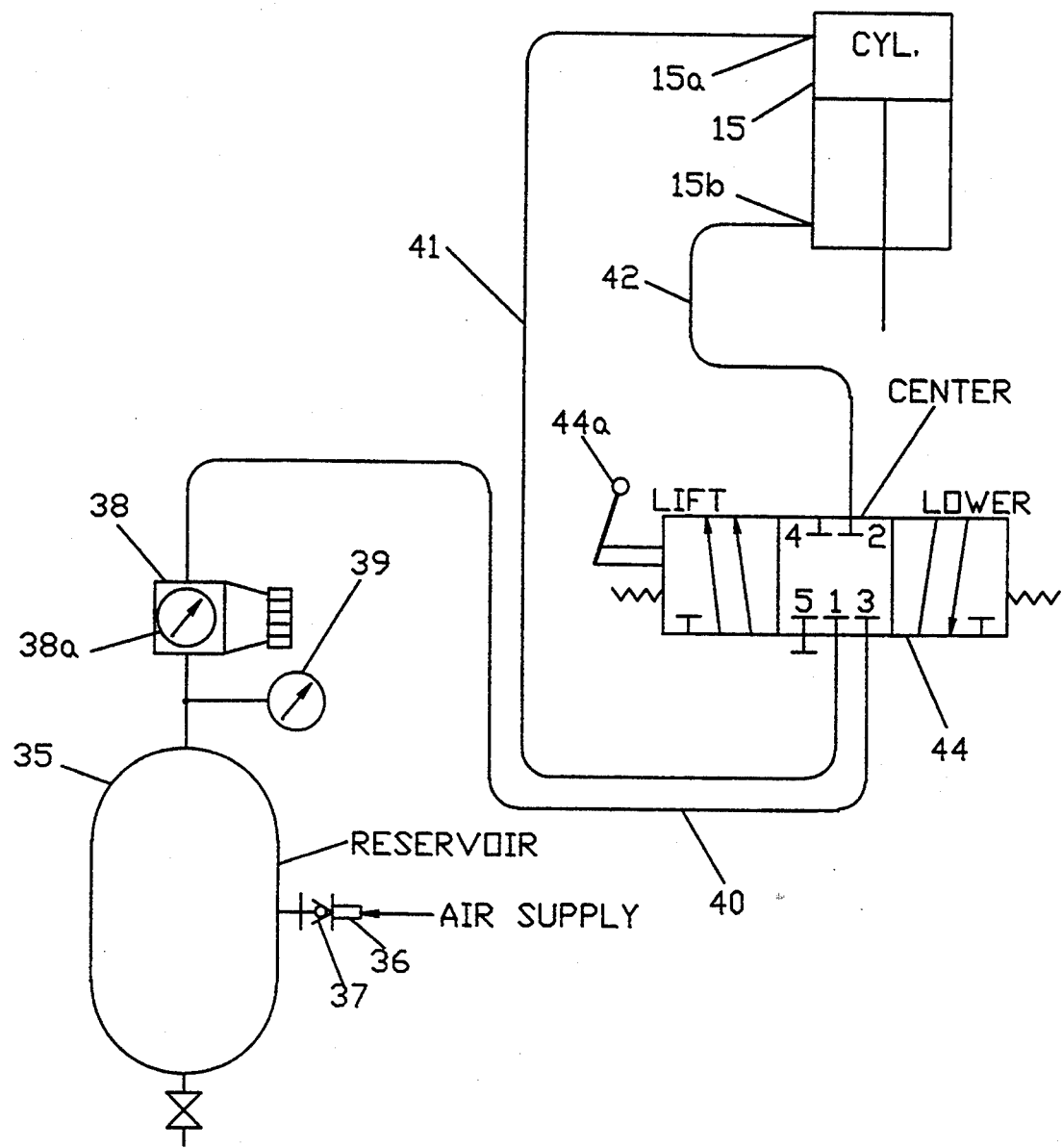
FIG. 7 is a schematic plan of the air control system.

Referring to FIG. 7, there is shown the air circuit schematic. The air storage tank 35 is charged by connecting an air supply hose (not shown) to the male nipple 36. The air then passes through a check valve 37 which prevents its escape. The pressure in the air storage tank 35 is recorded on the air pressure gauge 39. An adjustable air pressure regulator 38 is used to reduce the tank air pressure to the pressure required to lift the drum. This reduced air pressure is recorded on gauge 38a. Line 40 connects the air to a manually operated four-way spool valve 44 which has three positions: lift, center, and lower. In the center position of the valve 44, all ports are blocked and no air can flow through the valve. The valve is operated by handle 44a. With the handle released, the valve is centered with all ports blocked and the air supply line 40 is blocked at port 3.

When the operator desires to raise the lifting bar 9 piston rod 16 and drum 25 he pulls the handle 44a toward him which places valve 44 in the lift position. In the lift position, incoming air in line 40 is directed through port 3 to port 2 and line 42, to port 15b on cylinder 15, thereby raising the piston and piston rod 16. Air above the piston passes through port 15a and line 41 to port 1 on valve 44 and through valve 44 to port 4 where it is exhausted. The operator must pull and hold handle 44a for the period of time he wants the piston rod to raise. Should the operator release handle 44a, a spring in valve 44 will move the valve to the center position with all ports blocked which will stop and hold all movements of the piston and piston rod 16 and all items connected to it.

When the operator desires to lower the lifting bar 9 and drum 25, he pushes the handle 44a away from him which places valve 44 in the "lower" position. Incoming air in line 40 is blocked at port 3, thus no air from storage tank 35 is used. Air from line 42 and port 15b on cylinder 15 is directed through port 2 to port 1 on valve 44. From port 1 the air goes through line 41 to port 15a on cylinder 15 and pushes the piston down. Ports 4 and 5 on valve 44 are also connected but since port 5 is plugged and port 4 is open, nothing happens here. At this time there is pressure on both sides of the piston in cylinder 15. There is less area below the piston than above it due to the area of the piston rod on the bottom side. Also, the weight of the piston, the piston rod 16, the crossarm 9, and the items connected to crossarm 9 causes the piston rod to travel downward and lower crossarm 9 and any load supported by it. Should the operator release handle 44a, valve 44 will be centered by a spring in the valve and all ports in valve 44 will be blocked, thereby stopping the piston and piston rod movement and all things connected to the piston rod. The operator must push the handle 44a for as long as he wants the drum 25 on the crossbar 9 to be lowering.

Valve 44 is a standard, three position, four-way air valve but it has been connected and used in a manner not intended and probably not foreseen by the valve manufacturer. Normally, incoming air would be directed to port 1 with ports 2 and 4 directing the air to opposite ends of cylinder 15. However, with this arrangement incoming stored air would be used both when raising and lowering the piston and piston rod, thereby using twice the quantity of stored air that is used with the arrangement described previously.

Figure 8:
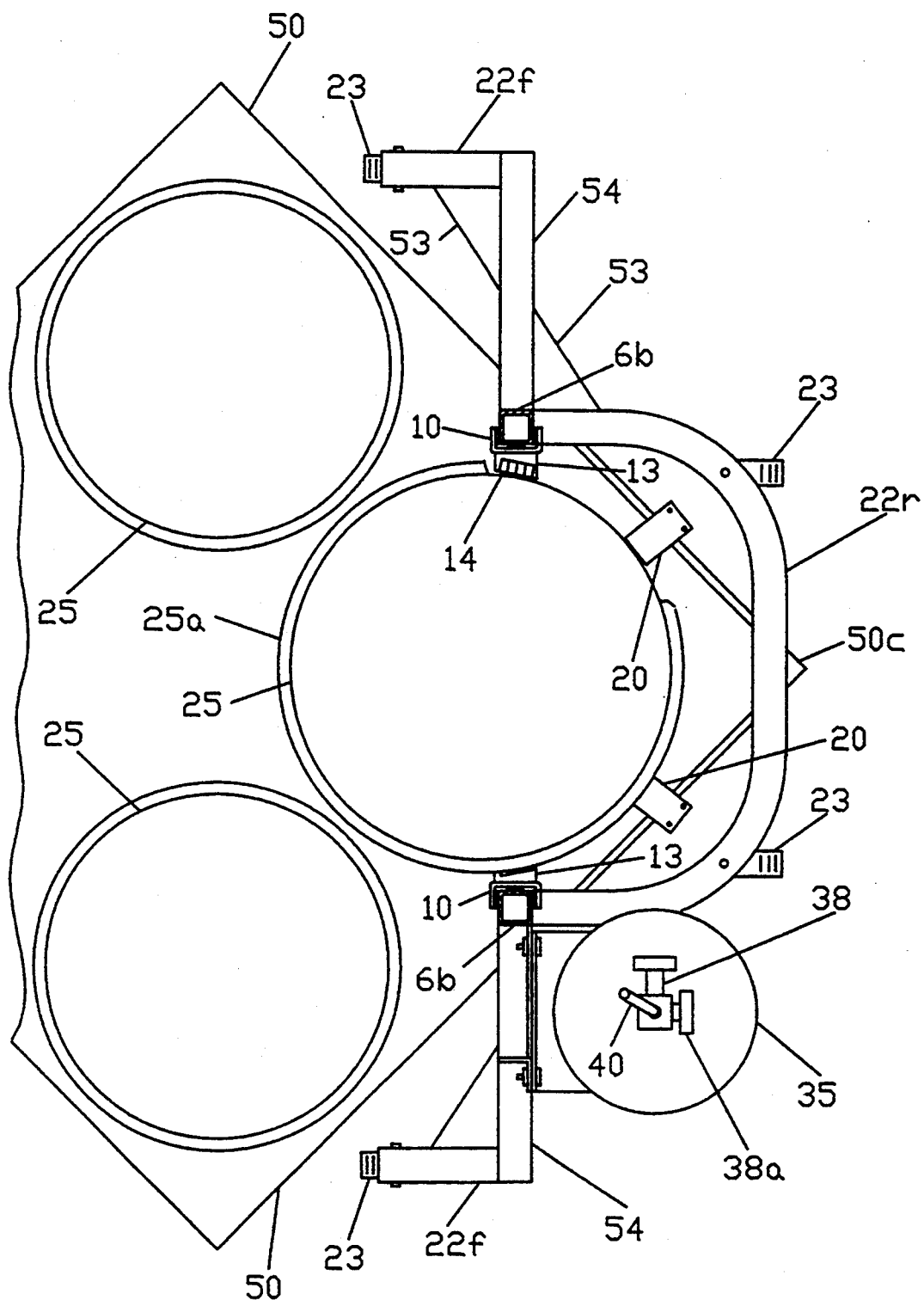
FIG. 8 shows a variation of the invention for use in loading drums on pallets.

FIG. 8 is a sectional plan view similar to FIG. 4, but incorporating a special base for loading drums 25—25 on a pallet 50. The front wheels 23—23 have been extended outward by means of the frame extensions 54—54 and gussets 53—53 so that these wheels 23—23 can straddle a portion of pallet 50 as shown. The frame 22 has been split to form the rear portion 22r and two front parts 22f—22f to mount the front wheels 23—23. Frame 22r is high enough to clear the pallet 50 which is shown with one corner 50c protruding below frame 22r and between the wheel guards. The air tank 35 has been relocated in FIG. 8 compared with FIG. 4. This gives the operator greater visibility of the drum 25 and pallet 50. The lift mechanism functions in the same manner as described for the drum mover, but it can lift higher because cylinder 15 and cylinder rod 16 are made longer. The upright 6b is also longer to accommodate the longer cylinder 15 and piston rod 16.

While this invention has been described in its preferred embodiment, it is to be appreciated that variations therefrom may be made without departing from the true scope and spirit of the invention.

What is claimed:

1. A carrier for a container provided with a circular ring having a circumferential section extending outwardly horizontally essentially entirely around the top portion of said container comprising a carrier body provided with means for moving said carrier body readily on a surface, a pair of supports on said carrier body adapted only to engage said ring thereunder at oppositely disposed points on said outwardly extending circumferential section only of said ring other than a diameter of said ring, means for causing said supports on said carrier body to be raised only vertically, and said pair of supports being the only means contacting said container for vertically lifting said container, means limiting the horizontal movement of the lower portion of said container below said ring while said container is being raised and while said carrier moves said container from place to place.

2. The carrier of claim 1 wherein the means for moving said carrier body readily on a surface comprises wheels.

3. The carrier of claim 1 wherein said means for vertically raising said support means includes pneumatic means using stored air.

4. The carrier of claim 3 wherein said pneumatic means for vertically raising said support means includes a manually controlled air cylinder.

5. The carrier of claim 1 wherein said pair of supports includes vertical guide means.

* * * * *